United States Patent [19]

Willard et al.

[11] Patent Number: 5,610,919
[45] Date of Patent: Mar. 11, 1997

[54] NETWORK IDENTIFICATION INFORMATION PLACEMENT ARCHITECTURE FOR MESSAGING SYSTEM HAVING ROAMING CAPABILITY

[75] Inventors: David F. Willard, Plantation; Eric T. Eaton, Lake Worth; Barbara D. Laflin, Ocean Ridge, all of Fla.

[73] Assignee: Motorola, Inc., Schaumburg, Ill.

[21] Appl. No.: 413,642

[22] Filed: Mar. 30, 1995

Related U.S. Application Data

[63] Continuation-in-part of Ser. No. 378,136, Jan. 24, 1995.
[51] Int. Cl.$^6$ ........................................................ H04Q 7/08
[52] U.S. Cl. .................... 370/336; 340/825.44; 455/33.1; 455/38.1
[58] Field of Search ............... 370/92, 94.1; 340/825.44; 455/33.1–33.4, 38.1–38.3

[56] References Cited

U.S. PATENT DOCUMENTS

| | | |
|---|---|---|
| 4,644,347 | 2/1987 | Lucas et al. . |
| 4,713,808 | 12/1987 | Gaskill et al. . |
| 4,734,694 | 3/1988 | Umetsu et al. . |
| 4,914,649 | 4/1990 | Schwendeman et al. . |
| 4,977,611 | 12/1990 | Maru . |
| 5,136,719 | 8/1992 | Gaskill et al. . |
| 5,168,271 | 12/1992 | Hoff . |
| 5,254,986 | 10/1993 | DeLuca .............................. 340/825.44 |

*Primary Examiner*—Melvin Marcelo
*Attorney, Agent, or Firm*—D. Andrew Floam

[57] ABSTRACT

Network roaming information (NRI), which comprises identifies a network (200) and a service area (210) within the network (200), a receiver address, is transmitted in a network (200) during a predetermined number of time slots of a signal, whereby the signal is transmitted in consecutive cycles, each cycle comprising a plurality of consecutive time slots. The placement of the NRI in the transmitted signal is made to be predicted by a receiver so that the receiver can compute an expected time slot location of a NRI to be compared with a stored NRI. The placement of the NRI is made according to an algebraic relationship between moduloN of the transmission frequency of the signal, moduloN of the order of the cycle, and moduloN of a portion of the NRI, wherein N is an integer.

16 Claims, 9 Drawing Sheets

FIG. 4

1 2 3 4 5 6 7 ... 21 ... 31 32 | PARITY | CK
x0 x1 x2 x3 c0 c1 c2 c3 f0 f1 f2 f3 f4 f5 f6 n0 r0 t0 t1 t2 t3 p p p p p p p p p
0 0 1 1 1 1 0 0 0 0 1 1 1 0 0 0 0 0 0 1

FIG. 5

1 2 3 4 5 6 7 ... 21 ... 31 32 | PARITY | CK
x0 x1 x2 x3 P0 P1 P2 P3 a0 a1 v0 v1 v2 v3 v4 v5 c0 c1 m0 m1 m2 p p p p p p p p p
0 1 0 1 0 1 0 0 1 1 1 1 0 0 1 1

FIG. 6

1 2 3 4 5 6 7 ... 21 ... 31 32 | PARITY | CK
x0 x1 x2 x3 f0 f1 f2 s0 s1 s2 s3 s4 s5 s6 s7 s8 s9 s10 s11 s12 s13 p p p p p p p p p
1 1 0 1 1 0 0 1 0 1 0 0 1 1 1 1 0 0 1 1

| FRAME | A | B | C | D |
|---|---|---|---|---|
| 0 | LID1  T<br>LID2 | T | T | T |
| 1 | | LID1<br>LID2 | | |
| 2 | | | LID1<br>LID2 | |
| 3 | | | | LID1<br>LID2 |
| 4 | LID1 | | | |
| 5 | | LID1 | | |
| 6 | | | LID1 | |
| 7 | | | | LID1 |
| 8 | LID1 | | | |
| 9 | | LID1 | | |
| 10 | | | LID1 | |
| 11 | | | | LID1 |
| 12 | LID1 | | | |
| 13 | | LID1 | | |
| 14 | | | LID1 | |
| 15 | | | | LID1 |
| 16 | LID1 | | | |
| 17 | | LID1 | | |
| 18 | | | LID1 | |
| 19 | | | | LID1 |
| 20 | LID1 | | | |
| ⋮ | | | | |
| 127 | | | | LID1 |

*FIG. 11*

| FRAME | A | B | C | D | |
|---|---|---|---|---|---|
| 0 | LID1 T<br>LID2 N1 | T | T | T | T |
| 1 | | LID1<br>LID2 N2 | | | |
| 2 | | | LID1<br>LID2 N8 | | |
| 3 | | | | LID1<br>LID2 N4 | |
| 4 | LID1<br>N5 | | | | |
| 5 | | LID1<br>N7 N6 | | | |
| 6 | | | LID1 N9 N10 | | |
| 7 | | | | LID1 N3 | |
| 8 | LID1 N1 | | | | |
| 9 | | LID1 N2 | | | |
| 10 | | | LID1 N8 | | |
| 11 | | | | LID1 N4 | |
| 12 | LID1 N5 | | | | |
| 13 | | | | | |
| 14 | | | | | |
| 15 | | | | | |
| 16 | | | | | |
| 17 | | | | | |
| 18 | | | LID1 N8 | | |
| 19 | | | | LID1 N4 | |
| • | LID1 | | | | |
| • | | | | | |
| • | | | | | |
| • | | | | | |
| 127 | | | | LID1 | |

NO TRAFFIC 5,610,919

NETWORK IDENTIFICATION INFORMATION PLACEMENT ARCHITECTURE FOR MESSAGING SYSTEM HAVING ROAMING CAPABILITY

RELATED APPLICATION

The present application is a continuation-in-part of U.S. application Ser. No. 08/378,136, filed Jan. 24, 1995.

FIELD OF THE INVENTION

The present invention relates to messaging systems, and more particularly to a messaging system having the capability for a receiver to roam and receive messages across a multitude of coverage areas.

BACKGROUND OF THE INVENTION

In today's mobile society, it is desirable to be reachable, such as, by a selective call receiver (pager), everywhere one travels, both locally close to home, as well as in more distant locations in the same country or across the world.

What is needed is a messaging method and system that is capable of accommodating roaming portable communication receivers, such as pagers, between coverage areas of the same service provider and across coverage areas of different service providers.

SUMMARY OF THE INVENTION

The present invention is directed to a system and method for a signaling protocol suitable for message transmission to a plurality of addressable receivers which is capable of accommodating roaming receivers and maintaining battery saving performance in the receivers by providing a scheme to enable a receiver to predict the time slot occurrence of certain address information in a transmitted signal.

The above and other objects and advantages will become more readily apparent when reference is made to the following description, taken in conjunction with the accompanying drawings.

BRIEF DESCRIPTION OF THE DRAWINGS

FIG. 4 illustrates a structure of a frame information word according to the present invention.

FIGS. 5 and 6 illustrate structures of block information words in which single simulcast identification (SSID) information is coded.

FIG. 11 is frame diagram illustrating the placement of the local area identification (LID) information and time information in accordance with the present invention.

DETAILED DESCRIPTION OF THE DRAWINGS

The present invention is directed to a selective call communication system capable of servicing or transmitting messages to receivers roaming between coverage areas. An example of a selective call signaling system to which the present invention relates is disclosed in commonly assigned U.S. Pat. No. 5,128,665. The entire text and drawings of U.S. Pat. No. 5,128,665 are herein incorporated by reference. The present invention, however, is not in any way limited to a particular type of signaling protocol, and has utility in many types of communication systems, a paging or messaging system being only an example.

Figure 1:
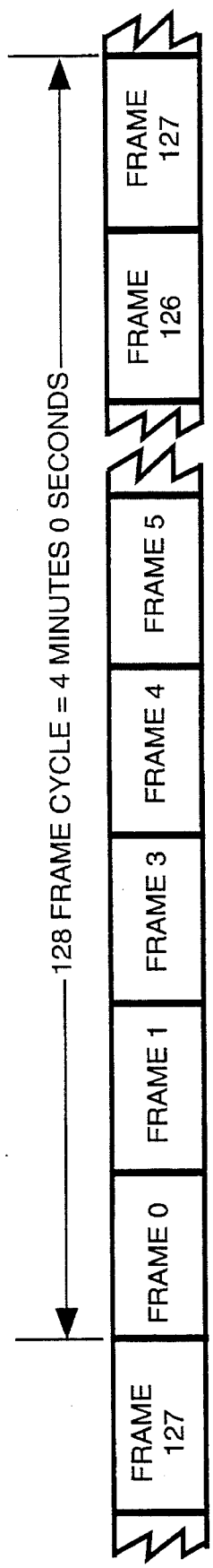
FIGS. 1–3 are timing diagrams illustrating a signaling protocol in accordance with the present invention.
Figure 2:
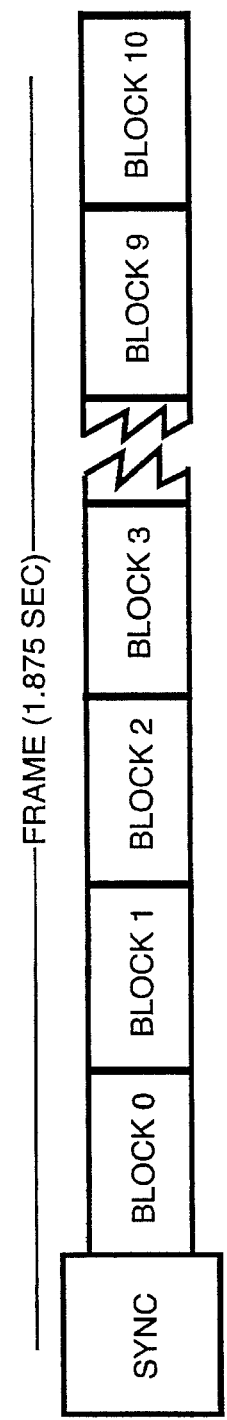
Figure 3:
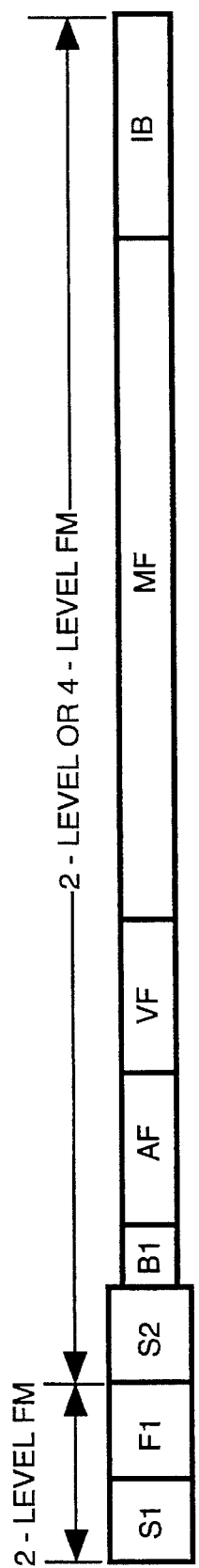

Referring to FIGS. 1–3, an example of a selective call communication system to which the present invention pertains is shown. The signaling system shown comprises 128 frames, with each frame numbered 0 to 127. The frames are transmitted at 32 frames per minute, and thus a full 128 frame cycle lasts 4 minutes. One hour is divided into 15 cycles numbered 0 through 14. It is a synchronous time slot protocol tied to a universal time reference. Frame 0 is synchronized to the start of each hour so that the receiver can derive real time from the current frame and cycle number, thus providing the receiver accurate time within the hour with no need for adjustment.

Moreover, the protocol supports multiple time division multiplexed "phases", wherein for example, a 6400 bits per second (bps) data stream is time division multiplexed into four data streams of 1600 bps. Such a signaling structure is disclosed in commonly assigned U.S. Pat. No. 5,168,493, the entire text and drawings of which is herein incorporated by reference. Thus, the general frame structure shown in FIG. 1 for the single phase shown in FIG. 1 is the same throughout each of four phases.

Each frame comprises a sync portion and several blocks. The sync portion further comprises a Sync 1 portion (S1), a frame information (FI) word and a Sync 2 portion (S2).

Each receiver is assigned a base frame in the set of 128 frames appearing on an radio frequency (RF) channel. A receiver can trade battery life for the more frequent delivery of messages by being assigned to monitor more than one frame per cycle. Once a receiver acquires synchronization to the RF channel, it expects to find its assigned frame within a very tight time window. The use of 4-level FM doubles the data transmission rate per symbol (as compared to 2-level FM) which helps to reduce the effect of simulcast distribution errors and the effect of propagation timing differences between multiple signals within the capture range of the receiver.

As shown in FIG. 3, the Sync 1 (S1) portion of each frame provides for frame timing, symbol timing and indicates the speed of the remainder of the frame. The frame information (FI) word carries 11 bits for the frame and cycle numbers, 5 bits for indication of the time division multiplexed phase of low traffic, 1 bit called a Network Roaming Channel Bit to indicate the presence of a frequency supporting Network-wide roaming service, and other information. The Network Roaming Channel Bit is used to trigger recognition of certain network roaming information which will be described in conjunction with FIG. 4.

The Sync 2 (S2) portion provides for synchronization at the frame's block speed to allow for proper de-multiplexing and decoding of the blocks.

The Block Information (BI) field is the first 1–4 words, called block information worlds, of the first interleaved block and contains frame and system structure information, some of which is pertinent to the present invention and is explained in greater detail hereinafter.

The address field (AF) starts directly after the block information words and consists of short addresses and long addresses. The vector field (VF) maintains a 1 to 1 relationship with the address field. The vector word points to the start word of the associated message. The message field (MF) contains the message words specified by the vector field. IB represents idle blocks which are unused and are filled with appropriate bit patterns.

FIG. 4 illustrates the structure of the frame information word in greater detail. The various parameters in the frame information word are defined as follows:

C Cycle Number (0–14) $c_3c_2c_1c_0$ 15/hour f Frame Number (0–127) $f_6f_5f_4f_3f_2f_1f_0$ 128/cycle n Network Roaming Channel Bit n=1 indicates network support for roaming and n=0 indicates no network support for roaming r Repeat Paging Indicator
  If r=1, $t_3t_2t_1t_0$ are reserved to indicate a repeat format exists
  If r=0, $tt_3t_2t_1t_0$ are Low Traffic flags for each phase in a frame t Definition dependent on value of "r"
  At 3200 bits/sec $t_3=t_2$ and $t_1=t_0$ representing two phases in the frame
  At 1600 bits/sec $t_3=t_2=t_1=t_0$ representing one phase in the frame t=1 Indicates address field contained in block 0 t=0 Indicates address field extends past block 0

These flags give early indication that the traffic is light and all addresses are contained within block 0.

x Standard 4 bit Check Character

FIG. 5 illustrates an example of block information word 1. Block information word 1 has 2 "a" bits, $a_0a_1$, which indicate the start of the address field, 6 "v" bits $v_5v_4v_3v_2v_1v_0$ which define the start of the vector field, 2 "c" bits $c_1c_0$ which indicate traffic overflow into the next frame(s), 3 "m" bits $m_0m_1m_2$ which indicate the number of high order frame number bits to be masked and 4 "P" bits $P_3P_2P_1P_0$, which indicate the number of priority addresses at the beginning of the address field.

FIG. 6 illustrates an example of block information words 2, 3 and 4. Word Format Type is represented by format bits $f_2f_1f_0$, s represents the data and x again is the standard 4 bit Check Character.

Below is a table which illustrates the bit pattern definitions for the f and s bits shown in FIG. 6. Depending on the values of bits $f_2f_1f_0$, the data bits $s_{13}$–$s_0$ have a particular meaning or application. When $f_2f_1f_0$ is set to (000), bits $s_{13}$–$s_0$ represent a 9 bit local area identification (LID) number ($i_8$–$i_0$) which identifies 512 possible LID's, and a 5 bit Zone number $C_4C_3C_2C_1C_0$, which represents 32 possible coverage Zones associated with a particular LID.

| $f_2f_1f_0$ | $s_{13}s_{12}s_{11}s_{10}s_9s_8s_7s_6s_5s_4s_3s_2s_1s_0$ | |
|---|---|---|
| 000 | $i_8i_7i_6i_5i_4i_3i_2i_1i_0C_4C_3C_2C_1C_0$ | 512 Local IDs, 32 Coverage Zones |
| 001 | $m_3m_2m_1m_0d_4d_3d_2d_1d_0Y_4Y_3Y_2Y_1Y_0$ | Month, Day, Year |
| 010 | $S_2S_1S_0M_5M_4M_3M_2M_1M_0H_4H_3H_2H_1H_0$ | Sec., Min., Hr. |
| 011 | Reserved for Future Use | |
| 100 | Reserved for Future Use | |
| 101 | $z_9z_8z_7z_6z_5z_4z_3z_2z_1z_0A_3A_2A_1A_0$ | Data, System Message |
| 110 | Reserved for Future Use | |
| 111 | $C_9C_8C_7C_6C_5C_4C_3C_2C_1C_0T_3T_2T_1T_0$ | Country Code, Traffic Splitting Flags |

Figure 7:
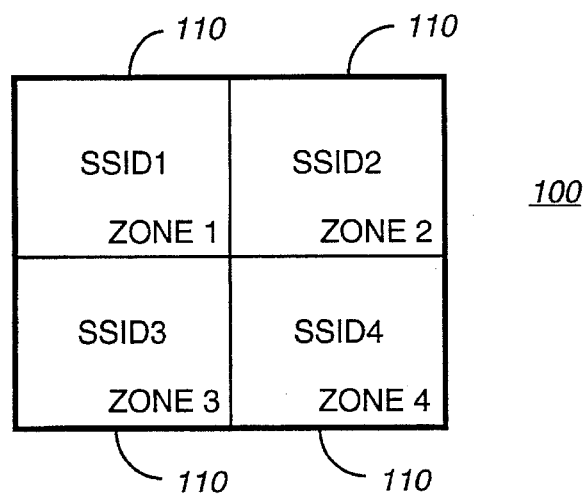
FIG. 7 illustrates a coverage area and zone divisions in accordance with the present invention.

When $f_2f_1f_0$ is set to (001) and (010), the data bit pattern $s_{13}$–$s_0$ represents month, day, year, second minute and hour information as shown in FIG. 7. The $f_2f_1f_0$ bit pattern (101) designates spare data bits $s_{13}$–$s_9$, a system message A3–A0 and time zone information Z3–Z0.

Finally, of importance is the $f_2f_1f_0$ bit pattern (111), which indicates a 10 bit Country Code c9–c0 and 4 bits called Traffic Splitting Flags, both of which will be described in more detail hereinafter.

The Country Codes follow, for example, the CCITT Standard which is well known in the art. The 10-bit Country Code is provided to permit reuse of LID's in different countries, following the CCITT standard assignment rules. Country Code information is useful by the nonsubscribing receiver to facilitate a more efficient scan search by first identifying in what country the receiver is located.

With reference to FIG. 7, the smallest division of a coverage area 100 is defined by a simulcast system identification (SSID). An SSID consists of and is uniquely identified by several identifiers: an LID, Zone, Country Code, Traffic Splitting Flags (TSF's) and Frequency. Each Zone 110 has a unique SSID. Thus, if a user desires to receive messages in more than one Zone, the receiver carried by that user would store each of the corresponding SSID's. The Zones shown in FIG. 7 need not be geographically adjacent one another.

In the example shown in FIG. 7, there are 512 possible LID's, each with 32 possible Zones. A "Zone" is a single simulcast area which may be associated with other simulcast areas in a coverage area through a common LID. For example, a service provider is given LID 123456789XXXXX. The service provider has the option to assign this LID to 32 different divisions of a coverage area or Zone. The northern part of a service provider's coverage area may be Zone 1 and would transmit 12345678900001, whereas a southern part is Zone 2 and transmits 12345678900010.

The Traffic Splitting Flags indicate the assignment of 4 groups of roaming traffic to a frequency (channel). Each roaming receiver which finds a frequency to carry a valid LID responds to only one of the 4 Traffic Splitting Flags. When a receiver's assigned flag is equal to 0, the receiver searches for another frequency with the same LID and the assigned flag set equal to 1.

The SSID information is coded into two words:

1st Word (000) 9 bits=512 LID's 5 bits=32 Zones

2nd Word (111) 10 bits=1024 Country Codes 4 bits=Traffic Splitting Flags

The 1st Word, called LID1 hereinafter, corresponds to the first Block information word (000) referred to in FIG. 3, and the 2nd Word, called LID2, corresponds to Block information word (111).

Time and calendar information (block information words f2f1f0=001, 010 and 101) when transmitted, are defined to occur in frame 0, or otherwise in the first valid frame following frame 0. In a roaming capable system, the LID together with the Zone, Country Code and Traffic Splitting Flags occupy the second and third block information words in frame 0. The fourth block information word carries the three available time and calendar information words and are sent in the fourth block information word position in frame 0 in a rotating sequence one block information word at a time over 3 consecutive cycles. This allows the block information words in 001, 010 and 101 to be updated 5 times each hour.

An advantage of this scheme is that the time and calendar information are delivered without addresses.

Bits A3–A0 define the type of message and a class of receiver for which it is intended, as shown in the table below. As an example, all receivers should look at this message, receivers which are using SSID frequency information should only look at this message, and/or only receivers which are using network roaming information (NRI) (to be described hereinafter) to lock to this channel should look at this message. Also instructions on which frequency to go to when a Traffic Splitting Flag is changed, and time zone information can be sent.

| A3 | A2 | A1 | A0 | |
|---|---|---|---|---|
| 0 | 0 | 0 | 0 | All message |
| 0 | 0 | 0 | 1 | Local message |
| 0 | 0 | 1 | 0 | Roam message |
| 0 | 0 | 1 | 1 | Roam Instruction |
| 0 | 1 | 0 | 0 | Time Zone |
| **** | | | | |
| 1 | 1 | 1 | 1 | Reserved for future use |

When a system message is indicated, an additional vector is added to the end of the vector field. A receiver decodes block information 4 and determines instruction type and which receivers should look at the message associated with this block information word. After the receiver has determined that it should look at the message it processes the address field and vector field as normal but there will be an additional vector at the end of the vector field. Only the receivers which are instructed to look for a message will look at this vector because all the address/vector combinations will point at message words that are located after this vector which is actually in the location of the first message word for the message field. Up to this point, a certain group of receivers have been informed that there is a message, what type of message to expect, and where to look for this message. Once the receiver enters the message field it decodes the message and handles it according to the message type.

An example of a system message is a greeting message transmitted to a receiver which is roaming into a coverage area outside of its home coverage area.

Another example of the utility of a system message is in connection with the Traffic Splitting Flags. When a service provider has two systems which have the same coverage area (i.e., redundant systems) or overlapping portions of coverage areas, and would like to move traffic from one of the systems to another, the following process is performed.

A system message as described above is sent out informing the receiver that there is going to be a traffic change and the traffic change information is a new frequency XXXXXX. The receiver adds this new frequency to its scan list. The receiver should move to XXXXXX frequency and look for an assigned SSID or NRI on this other frequency. In a later transmission, which could be one month later or it could be 1 minute later, the Traffic Splitting Flag is unset on one frequency and set on the other redundant coverage area system. The receiver detects that roaming traffic is no longer supported on this channel and moves to the frequency it was instructed to go to by the message. Once there, the receiver determines if the SSID or NRI and Traffic Splitting Flag is set correctly. When the SSID or NRI information stored in the receiver match the corresponding transmitted information, the receiver stays on the frequency (and adds this frequency to its scan list). When a match is not made, the receiver will go back to the frequency it was originally on to make sure that it was not a mistake. When that frequency no longer supports the receiver's roaming traffic, the receiver will start looking on its own (scanning the band) for an SSID or NRI match.

Another way to handle traffic splitting is for the system to unset the Traffic Splitting Flag and let the receiver find a new system transmitting that receiver's SSID or NRI.

It should be understood from the foregoing that the same LID and Zone values may be used by the same provider or other providers on other channels.

Stored in each receiver is a list called a scan list, which contains at least one SSID. In each Zone, an SSID is transmitted in a predetermined number of frames, as will be explained hereinafter in conjunction with FIG. 11.

Figure 8:
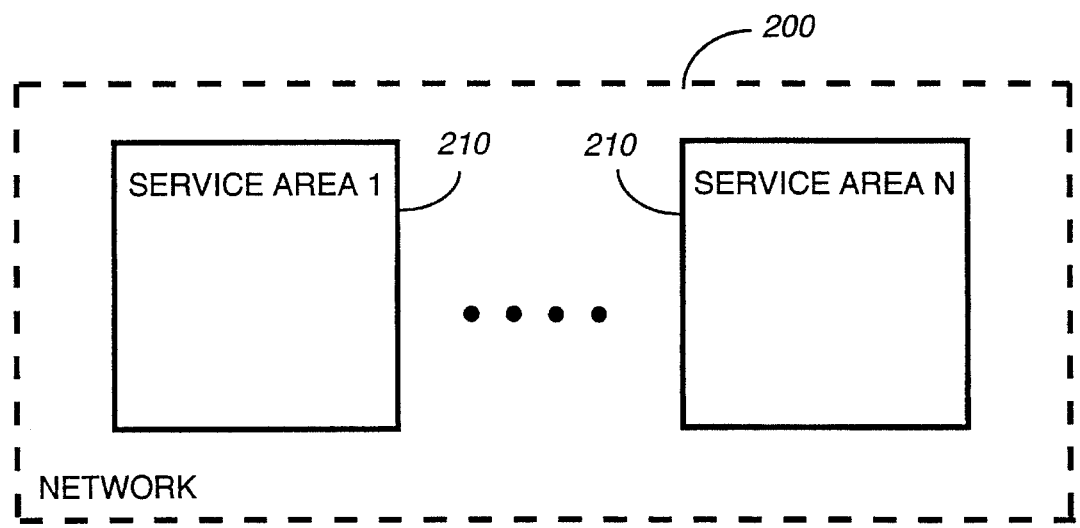
FIG. 8 illustrates a network and service area divisions according to the present invention.

Turning now to FIG. 8, in the case where a receiver desires coverage over a larger region, or to receive messages on multiple frequencies, which would otherwise be defined by multiple SSID's, a single piece of identification information is used, rather than multiple SSID's. This is called network roaming information (NRI). A "Network" 200 is defined as a collection of many Service Areas 210 and a Service Area 210 is a conglomeration of coverage areas 100 which is otherwise defined by a plurality of SSID's. Thus, in a simple case, a Service Area 210 shown in FIG. 8 is the same as the coverage area 100 shown in FIG. 7, and comprises multiple Zones.

An NRI consists of a network identification (NID), a Service Area (SA), Traffic Splitting Flags, and a 3-bit NID multiplier to expand the number of unique Networks.

A Network may be formed by an agreement between several otherwise separate service providers, or may be a single large service provider. In a Network, there is a plurality of Service Areas, and in the example described herein, there are 32 possible Service Areas within a Network, identified by a 5 bit pattern, but a Network may be defined to consist of many more or less Service Areas.

As shown in FIG. 8, in each Zone of a Service Area, one SSID is transmitted and at least one, but possibly several, NRI's are transmitted, as indicated by N1, N2, etc. Thus, one Zone is potentially affiliated with multiple Networks or Service Areas, and would be required to transmit corresponding NRI's. The boundaries shown FIG. 8 depict functional boundaries, and not necessarily geographical boundaries. However, no matter where geographically located, all Service Areas within a common Network are required to transmit the same NID sequence or Network identifier. Individual Service Areas within a Network are specified by the Service Area identifier.

Figure 9:
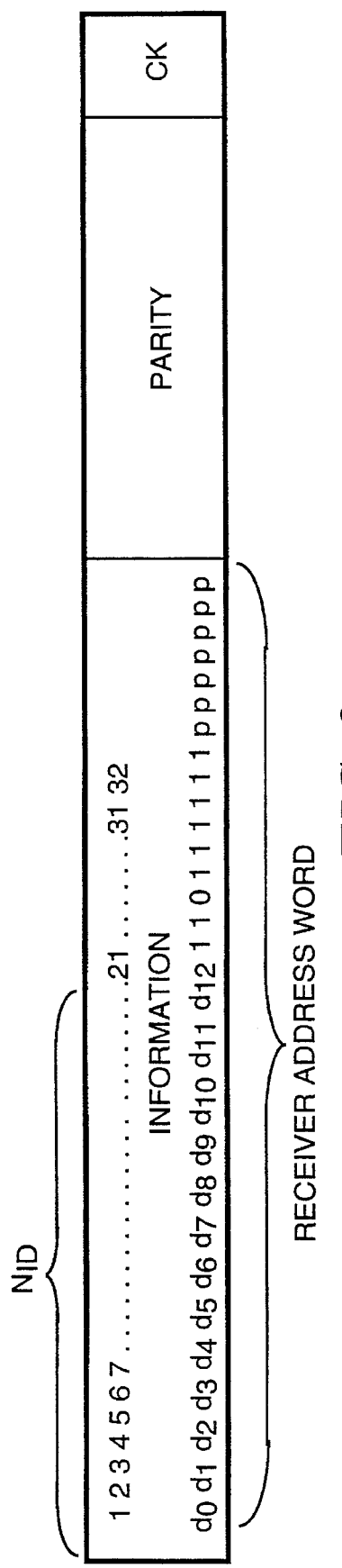
FIG. 9 and 10 illustrate structures of an address word and a vector word, respectively, in which network roaming identification (NRI) information is coded in accordance with the present invention.
Figure 10:
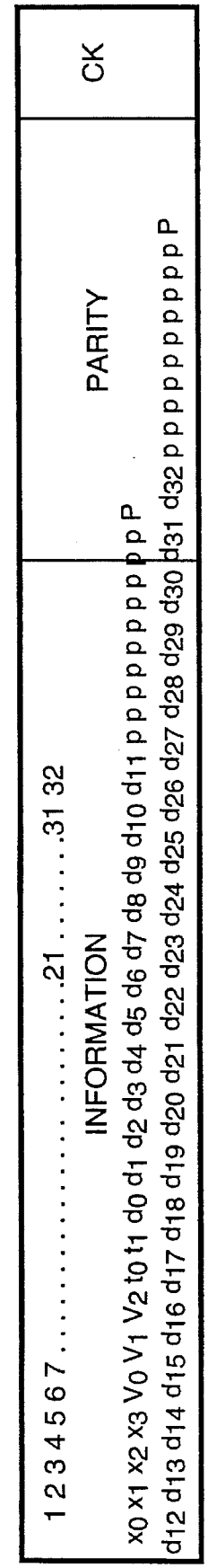

FIGS. 9 and 10 illustrate the manner in which the NRI is encoded in the signal transmitted in each Service Zone. FIG. 10 illustrates a conventional 32-21 binary coded hexadecimal (BCH) address word, which is well known in the art. The first, 21 bits, d0–d20 of this word are used to define an NID, 12 bits of which are used to uniquely identify 4096 networks, as an example.

FIG. 10 illustrates the vector word structure associated with the address word of FIG. 9. The table below gives the bit definitions associated with the vector word of FIG. 10.

| $t_1t_0$ | $d_{11}d_{10}d_9d_8d_7d_6d_5d_4d_3d_2d_1d_0$ | |
|---|---|---|
| 00 | $c_3c_2c_1c_0b_3b_2b_1b_0a_3a_2a_1a_0$ | -3 Numeric Characters with Short Address or 8 Numeric Characters with Long Add. |
| | a11a10a9 . . . a0 | or 12 bits usable for Roaming Networks |
| 01 | $S_8S_7S_6S_5S_4S_3S_2S_1S_0S_2S_1S_0$ - | 8 Sources plus 9 or 30 Unused Bits |
| 10 | $s_1s_0R_0N_5N_4N_3N_2N_1N_0S_2S_1S_0$ | 8 Sources, 0–63 Message Number, Message Retrieval Flag, and 2 or 23 Unused bits |
| 11 | | Spare Message Type |

Bits V0V1V2 are used to specify the vector type, such as numeric, tone-only, etc. When the V0V1V2 are set to a value corresponding to a particular type, such as short message/tone only, this signifies that the 12 bits d0–d11 specify a Service Area, Traffic Splitting Flags and Network multiplier. For example, a0–a4 define the Service Area (32 possible) a5–a8 are the Traffic Splitting Flags and a9–a11 are Network multiplier bits. The Network multiplier bits allow for 8 times 4096 more unique NID's.

In certain circumstances when the network address has a system message attached thereto, the 12 bits defining the additional NRI information reside in the message field and the vector would otherwise operates as a vector pointing to the system message in the message field, where the 12 previously described bits also reside.

Figure 12:
FIG. 12 is a frame diagram illustrating a placement configuration of the NRI information in accordance with the present invention.
Figures 13, 14:
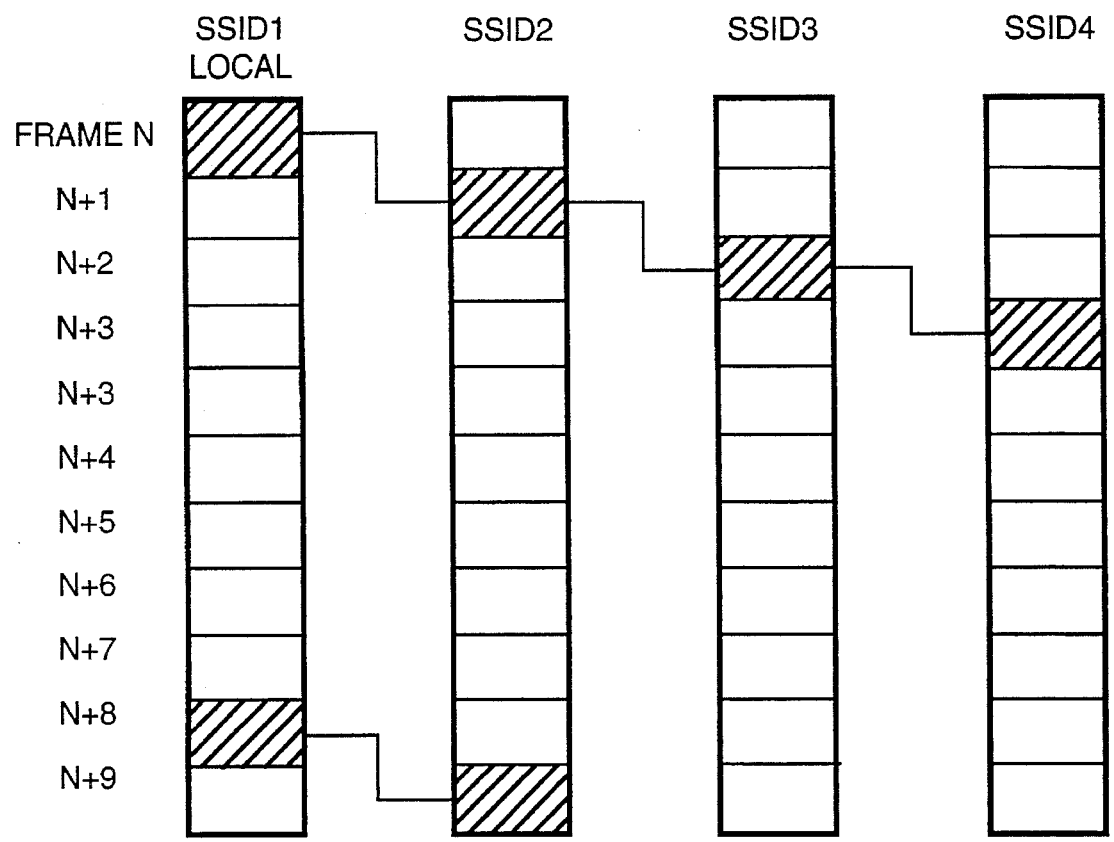
FIG. 13 is a frame diagram illustrating an example of the placement configuration of the NRI information in accordance with the present invention.
FIG. 14 is a diagram illustrating a scan sequence used by a receiver for channel identification during possible frequency overlap situations.

In each Service Area, the transmitted signal includes the NRI associated with that Service Area. The placement structure of the various parts of the NRI in the signaling protocol is shown in FIGS. 12 and 13. In a receiver which is roaming in a Network, a frequency scan list is stored which includes a list of frequencies for which there is a high probability that an NRI match will be obtained. The placement structure of FIG. 13 provides for a way to predict where the NRI information can be found. In any event, when a match cannot be found from the stored scan list, then the receiver searches its entire synthesizer bandwidth. Once the receiver locks onto frame 0 on a particular frequency, a candidate frequency is qualified or disqualified quickly.

FIG. 11 illustrates the placement'structure of the SSID information in a four phase (time division multiplexed) expansion of the frame structure shown in FIG. 1. When a single phase system is used, then all of information in phases A, B, C and D collapse into the phase A. When a two phase system is used, then phases A and B collapse together to form one phase and phases C and D collapse together to form another phase.

As is well known in the art, a time division multiplexed system with multiple phases A, B, C and D provides certain traffic handling advantages for a service provider. A receiver capable of decoding information from only a single phase is assigned to a particular phase by the service provider at the time service is initiated. Some receivers are capable of decoding information from one phase at a time, but can switch to a different phase. In this case, a service provider can initially assign a receiver to a particular phase, but can use the system messages described above to inform the receiver from time to time that messages will be transmitted on a different phase. Finally, some receivers are capable of decoding multiple phases and can therefore, as shown by FIG. 11, lock onto an assigned frame quicker than a single phase receiver.

In order to provide roaming service, all channels (frequencies) in a system which are roaming-capable are required to transmit fully a predetermined number of flames. It is required that all roaming channels transmit fully a first predetermined number of frames, such as frames 0 through frame 7 with frame 0 aligned to the four minute time mark. It is established, in this example, that frames 0–3 must be present and that these frames contain the LID words LID1 and LID2 in the frames and phases as shown in FIG. 11. It should be understood that the invention is not limited per se to frames 0–3, and that any number of other frames may be chosen as the "required" frames for transmission. Frames 0–3 are exemplary of Frames 0–N.

Across the phases, LID1 and LID2 are offset by one frame so that a receiver assigned to a specific phase is able to determine its desired SSID presence in the least amount of search time on each channel, and to balance or distribute information overhead among the phases.

The placement structure shown in FIG. 11 provides a known time position to allow for quick processing of candidate frequencies when a receiver is roaming. If the roaming decision can be made on the basis of LID's only, then 4 (frames 0–3) channels can be processed every four minutes. Since frames 0–3 must be present, a fast scan over a large bandwidth is made possible using symbol rate detection to identify roaming capable channels. LID2 is transmitted only in each phase once per cycle and LID1 is transmitted every four frames, once in each phase (in at least frames 0–7).

For systems using only SSID's for roaming coordination between zones within a coverage area (service area), (no NRrs for network wide roaming) the mandatory or required 4 frames (frames 0–3) is acceptable. In this case, every frame transmitted is required to carry the block information word 000 and the mandatory frames 0, 1, 2 and 3 are required to carry both block information words 000 and 111. Roaming channels are identified during the mandatory frame time. During the rest of the cycle, any frame received is examined and eliminated if the SSID does not match. However, the absence of the protocol in any frame other than frame 0, 1, 2 or 3 cannot be used to disqualify a channel. Thus, during a "fast scan" through the bandwidth procedure, a pager may look for signal in the protocol in frames 4–127 and if signal in the protocol is detected, the pager would examine block information word 000; if no match is made, then the channel is eliminated. Those channels identified in such a "fast scan" process during the mandatory frames which could not be detected in frames 4–127 would be examined in frame 0, 1, 2 or 3 in order to determine the SSID.

"T" refers to the optional presence of three block information words sent out in frame 0 on a rotating basis to indicate time and calendar information, as described above. The "T" type block information words are sent out in all 4, 2 or 1 phases depending on the system operating speed. It takes 3 cycles to completely refresh a receiver with a complete set of time and calendar information (5 updates each hour). The time/calendar instructions are optional, but when carried by the system, are required to follow the rotating pattern of one selection in every cycle. This format provides a known time/calendar position to permit a receiver to quickly process the candidate frequencies when roaming. The rotational sequence is changeable so that a "T" block information word format 101 is used to send a roaming system message when needed.

In terms of the LID placement rules, the present invention is directed to a method for communicating messages to a plurality of addressable receivers, the method comprising steps of:

dividing a coverage area into a plurality of zones;

assigning to each coverage area a coverage area identifier which comprises at least a local area identifier and a zone identifier such that the local area identifier is common throughout a coverage area, the zone identifier for identifying a zone within a coverage area;

storing in at least one receiver subscribed for receiving messages in at least one particular network a coverage area identifier associated with the at least one particular coverage area;

generating a signal for transmission in each zone, the signal including at least one coverage area identifier corresponding to a zone within a coverage area, the signal comprising a plurality of consecutive time cycles, each time cycle comprising a plurality of consecutive time slots, the coverage area identifier being located in first predetermined number of time slots of the signal; and transmitting the signal in each zone.

Turning to FIG. 12 a placement architecture for NRI information will be described which is useful in connection with coordinating network-wide roaming. All NRI's supported on a channel are required to appear at least once during a first predetermined number of frames, such as frames 0–7. For shared channel operation, the service providers who share the channel agree to support each others NRI placement rules in frames 0–7. This allows a pager to operate without distinguishing the presence of more than one service provider on the channel. N1–N10 in FIG. 12 represent 10 different NRI's.

All NRI's supported on the channel are required to appear at least once during frames 0–7. The NRI's are also required to appear in any one of the 128 frames that the calculations determine them to appear.

An expected or predicted position for an NRI is determined by the following set of rules:

(a) Each frequency or channel transmitted in a network is represented by a number in the range of 0–7. M=Modulo8 of Integer [Freq kHz/Channel Spacing kHz]

(b) N=Modulo8 of NID (same as 3 least significant bits);

(c) C=cycle number (0–15); and (d) Expected frame=F=Modulo8 of [N+M+C].

According these rules, it is possible to search 8 consecutive frequencies for the same NRI in the 15 second (8 frame) period at the beginning of each 4 minute period of time. The phase chosen to carry the NRI is the same phase as that carrying the LID. It also causes the NRI to shift one frame each cycle which alleviates possible "shadow" problems in the case of a receiver located where two systems have overlap. This placement sequence has a lower NRI "overhead" for cases where the channel carries less than 16 NRI's.

Generalizing, the NRI placement rules involves placing the NRI in one of a first predetermined number I of frames, and providing for a predicted frame position using moduloI arithmetic based on the frequency of transmission, 3 least significant bits of the NID portion of the NRI, and the cycle number (0–15).

FIG. 13 illustrates an example in which 10 NRI's, represented by the numbers 1–10, are carried on a channel with mixed or no traffic after frame 7.

An example of how a pager predicts an expected frame is set forth below:

Network ID (NID stored in capcode of pager)=2,008,123 (same result if use the over the air value)

Frequency to be inspected 885,375.125 Khz (frequency not necessarily an actual frequency, but used for this example)

Channel spacing in this RF band=25 Khz

Present FLEX Cycle Number=13

M—Channel Number 885,375.125/25=35,415.005 Integer Part=35,415 Modulo 8 (35,415)=7

M=7

N Network Address Number

Modulo 8 (2,008,123)=3

N=3

C Cycle Number Mod 8=Modulo 8 (13)=5

Expected Frame F=Modulo 8 (7+3+5)=Mod 8 (15)=7

Thus, the pager expects that its NRI will appear on this channel in Frame 7 during Cycle 13. It will also appear in those frames which Modulo 8 (Frame #)=7 if they are transmitted. To determine which frame outside of the first N frames the NRI is present, the location of the NRI within the first 8 frames is known and its location is precessed (or offset by one frame higher) therefrom in subsequent cycles. Therefore, the expected frame location can be determined in any subsequent cycle on the basis on a known position in a previous cycle.

The receiver determines which cycle is being transmitted once it is locked onto a channel and determined that the network bit is set. From the frame information word in a frame, the receiver determines the cycle number of the current cycle being received, as explained above in conjunction with FIG. 4. Thus, the calculation of the expected frame in the current cycle and succeeding cycles is made, recalling that once the expected frame is known in one cycle, it is precessed one frame in succeeding cycles. Consequently, the expected frame outside of the first 8 frames can also be determined so that a receiver can locate and decode an NRI outside the mandatory frames 0–7.

In summary, according to one aspect, the present invention is directed to a method for communicating messages to a plurality of addressable receivers, the method comprising steps of:

dividing a network into a plurality of service areas, each service area comprising at least one zone;

assigning to each network a network roaming identifier which comprises at least a network identifier and a service area identifier such that the network identifier is common throughout a network, the service area identifier for identifying a service area within a network;

storing in at least one receiver subscribed for receiving messages in at least one particular network a network roaming identifier associated with the at least one particular network;

generating a signal for transmission in each zone, the
signal including at least one network roaming identifier
corresponding to a network that includes a service area
corresponding to that zone, the signal comprising a
plurality of consecutive time cycles, each time cycle
comprising a plurality of consecutive time slots, the
network roaming identifier being located in an ordered
time slot based on an algebraic relationship between a
transmission frequency of the signal, an order of a time
cycle, and a binary representation of at least a portion
of the network roaming identifier; and transmitting the signal in each zone.

The LID placement rules and the NRI placement rules are implemented together in certain zones. Thus, the present invention is further directed to a method for communicating messages to a plurality of addressable receivers, the method comprising steps of:

dividing a network into a plurality of service areas, each service area comprising at least one coverage area, and each coverage area comprising at least one zone;

assigning to each network a network roaming identifier which comprises at least a network identifier and a service area identifier such that the network identifier is common throughout a network, the service area identifier for identifying a service area within a network;

assigning to each coverage area a coverage area identifier which comprises at least a local area identifier and a zone identifier such that the local area identifier is common throughout a coverage area, the zone identifier for identifying a zone within a coverage area;

storing in at least one receiver subscribed for receiving messages in at least one particular network a particular network roaming identifier associated with the at least one particular network;

storing in at least one receiver subscribed for receiving messages in at least one particular coverage area at least one particular coverage area identifier associated with the at least one particular coverage area;

generating a signal for transmission in each zone, the signal including at least one network roaming identifier corresponding to a network that includes a service area corresponding to that zone, and the signal including a coverage area identifier corresponding to a coverage are that includes that zone, the signal comprising a plurality of consecutive time cycles, each time cycle comprising a plurality of consecutive time slots, the network roaming identifier being located in an ordered time slot based on an algebraic relationship between a transmission frequency of the signal, an order of a time cycle, and a binary representation of at least a portion of the network roaming identifier, and the coverage area identifier being located in at least a first predetermined number of ordered time slots of each time cycle; and transmitting the signal in each zone.

FIG. 14 illustrates a frame offset mechanism which enables a receiver to scan frequencies in every frame which are offset from its home frame as indicated. This frame offset method is useful in situations where a receiver is straddling an area where there is two or more possible matching frequencies in the same coverage area. In order that a match on any of the possible frequencies can be achieved, for each frequency of which coverage is desired, a frame is chosen in which the receiver can match SSID information, which is different from the frames for the other frequencies. For example, as shown in FIG. 14, the frame chosen in each frequency is offset by one frame. Other flames could also be chosen. Consequently, the receiver is able to detect all SSID's since each is assigned to a different frame in the cycle.

Figure 15:
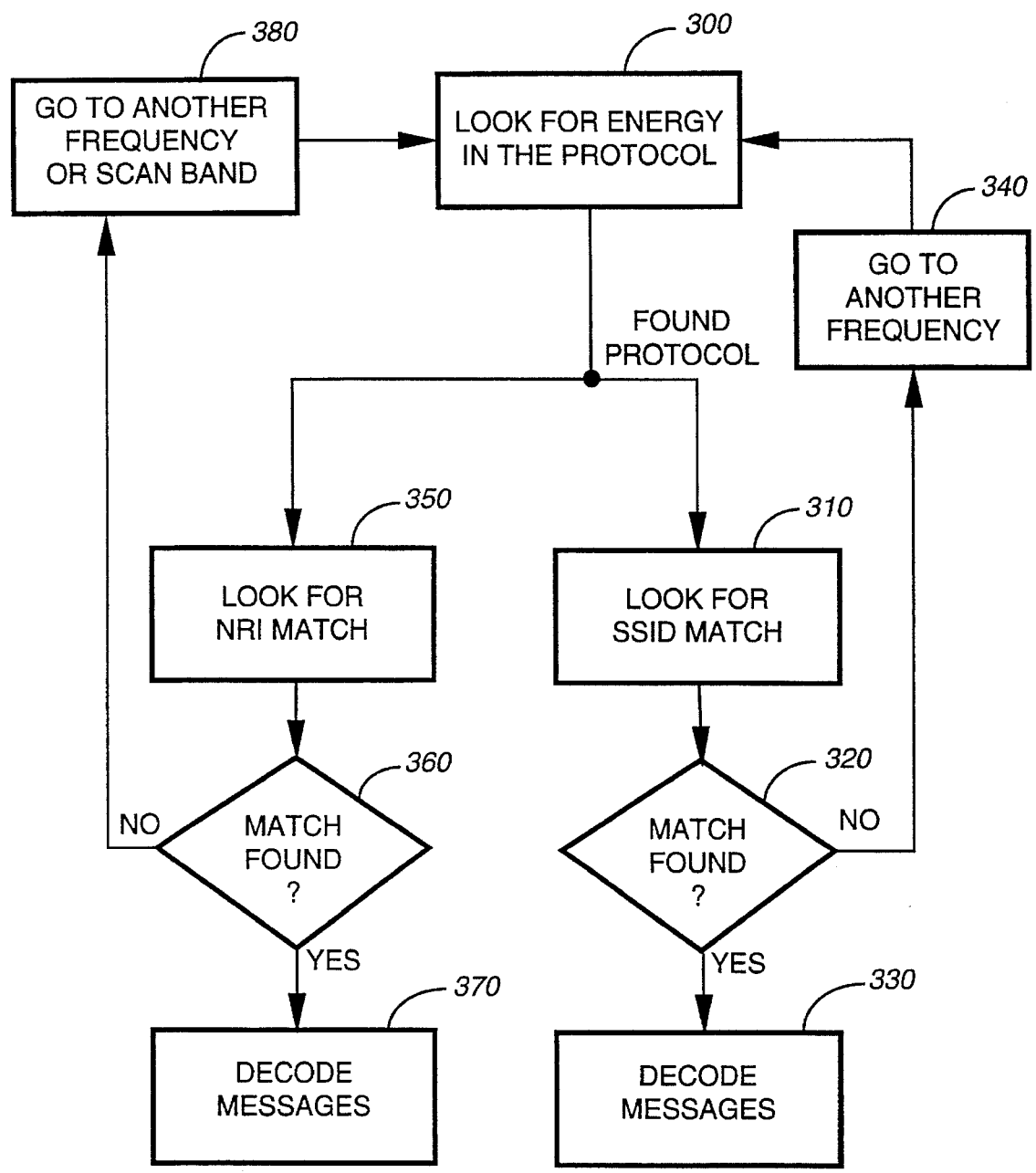
FIG. 15 is a flow chart generally illustrating how a receiver detects SSID and NRI information.

Turning now to FIG. 15, a procedure by which a roaming receiver decodes a message will be described. From the outset, it should be understood that there are a variety of receivers capable of roaming in accordance with the present invention, including single frequency receivers and frequency synthesized receivers which can lock to any frequency in a predetermined bandwidth. Also, both of these receivers may be fixed phase, variable phase or multiple phase receivers.

Regardless of receiver type, when entering a new area in which a receiver has yet to lock onto a signal transmitted in accordance with an established protocol, it is likely that from the last message receiving session the receiver has an approximation of the occurrence of frame 0 at some frequency. The accuracy of this approximation is dependent on the crystal oscillator in the receiver.

In step 300, the receiver attempts to detect energy in the protocol on the last frequency on which it operated. When the receiver has an SSID subscription, the procedure follows on the right side of the flow chart. When the receiver has an Network coverage subscription, the procedure goes to the left side of the flow chart.

In step 310, once frame 0 of a cycle is found, the receiver can detect and compare the SSID information encoded in the transmitted signal with its stored SSID information. This process is performed according to the placement rules described in conjunction with FIG. 11. When a match is found as indicated in step 320, the receiver can locate its assigned frame to decode the message(s) addressed to it in step 330.

However, if the SSID in the transmitted signal does not match with the SSID stored in the receiver (accounting for the current frequency of the receiver), then in step 340, the receiver switches to another frequency, if it is capable of doing so. When the receiver is a single frequency receiver, then it cannot tune to another frequency and will enter a time-out mode and/or a message is optionally displayed on a display of the receiver indicating its inability to receive messages in that current location of the receiver.

When the receiver has only NRI information stored in it, then from step 300, the procedure goes to step 350 and looks for an NRI match, taking into account the NRI placement rules of FIG. 12 or FIG. 13. When a match is found as indicated in step 360, the receiver locates its assigned frame and decodes its addressed messages in step 370.

However, in the event that a match is not found in step 360, in step 380 the receiver tunes to another frequency by referring to a recent list of frequencies where matches have been previously found. When no such list exists in the receiver, then the receiver begins scanning across its band to look for energy in the protocol and the process repeats from step 300.

When a single frequency receiver subscribes to Network coverage, then if a match is not found in step 350, a message is optionally displayed on the receiver that the user has gone outside a subscription area, the receiver is not functioning properly, or the service provider is not transmitting information on that frequency. A time out period is initiated and the process repeated some period of time later in an attempt to find an NRI match.

Below an example of a scan list is shown. Generally, the first entry in the list is the last frequency and associated SSID or NRI that the receiver locked to. Next, the SSID's are listed, and finally, the NRI's are listed with an associated frequency. Thus, a receiver attempts to lock to the last frequency and associated SSID or NRI on which it received messages, and then proceeds through the SSID information, and finally the NRI information.

| FREQUENCY | SSID | NRI |
|---|---|---|
| Frequency 1 | — | NID1 |
| Frequency 2 | SSID2 | |
| Frequency 5 | SSID3 | NID1 |
| Frequency 3 | — | NID1 |
| Frequency 4 | — | NID1 |
| Frequency N | SSIDN | NID1 |

Figure 16:
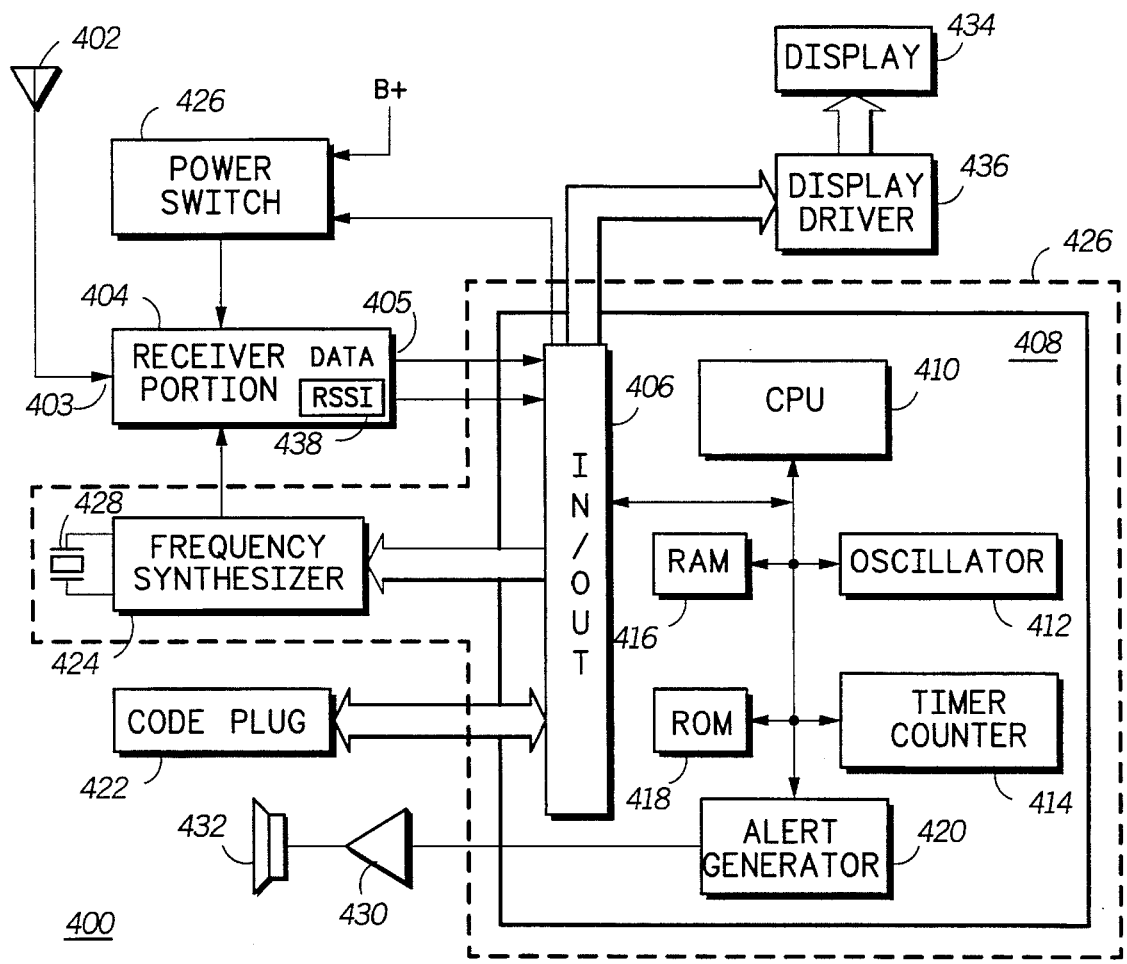
FIG. 16 is an electrical block diagram of a selective call receiver in accordance with the present invention.

FIG. 16 shows an exemplary electrical block diagram of a receiver 400, and particularly a selective call receiver, according to the present invention. Coded message signals transmitted are received by an antenna 402 which couples to the input 403 of the receiver portion 404. The receiver portion 404 preferably is an FM receiver. The received coded message signals are processed by receiver portion 404 in a manner well known in the art, and provided at the output 405 as a stream of binary information. The output 405 couples to the input/output (I/O) port 406 of the microcomputer 408. Receiver portion 404 optionally includes received signal strength indicating (RSSI) means 438 which also connects to the I/O port 406 of the microcomputer 408.

Microcomputer 408, which is embodied, for example, by a Motorola MC68HC05 series microcomputer, performs a variety of functions, including decoding the binary information. Microcomputer 408 includes a CPU 410, oscillator 412, timer counter 414, random access memory (RAM) 416, read only memory (ROM) 418 and alert tone generator 420. CPU 410 controls the operation of receiver 400 and processes the received coded message signals. Oscillator 412 provides the clock for the operation of the CPU 410, and provides the reference clock for timer counter 414. The oscillator 414 is controlled by a crystal, not shown in the diagram. Assigned transmission slot and channel identification information and pager addresses are stored in code plug 422, which is a programmable read only memory, such as an electrically erasable programmable read only memory (EPROM). In addition, the SSID information and NRI information is also stored in the code plug 422. The RAM 416 is used to store code plug information when the receiver 400 is initially turned on, and to store messages as they are received. ROM 418 contains the firmware which controls the microcomputer operation. The firmware includes such programs as for controlling the decoding of transmission slot identify information, channel identification information, receiver address, receiver scanning frequency lists, NRI information, SSID information, and other receiver functions. Alert generator 420 generates an audible alert signal upon reception of a message.

When the receiver 400 is initially turned on, microcomputer 408 functions as a synchronization means, enabling the receiver 400 to synchronize the assigned transmission slot, after the receiver detects information in frame 0 and synchronizes to the transmitted signal. Microcomputer 408 also functions as the decoder for decoding channel identification information, LID information, NID information and pager address information. Microcomputer 408, in conjunction with frequency synthesizer 424, functions as a channel selecting means 426 used to control the scanning of the receiver 400. Microcomputer 408, in conjunction with power switch 428, provides a battery saving function for the receiver 400.

Figure 17:
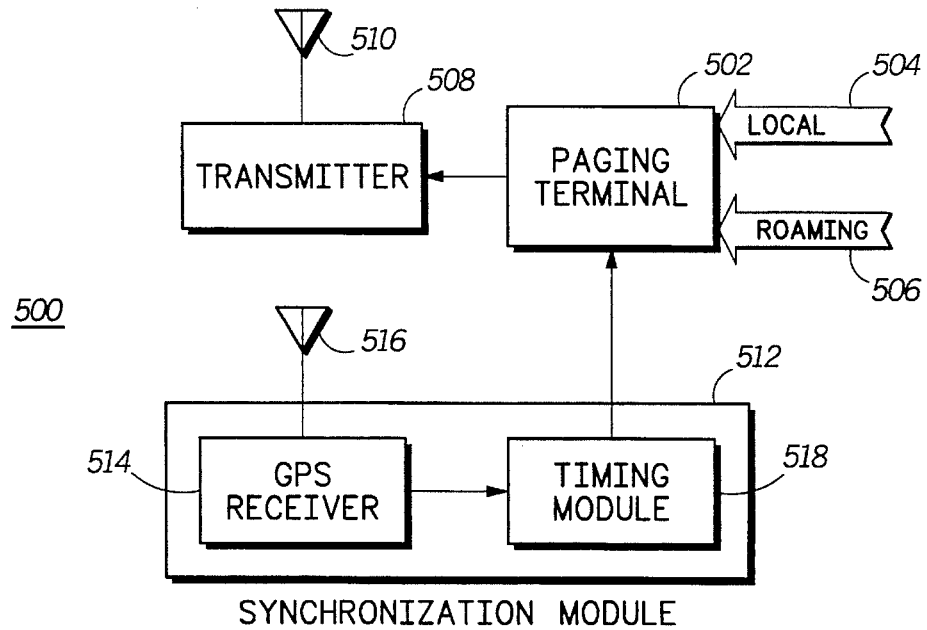
FIG. 17 is an electrical block diagram of a transmitter station in a paging system according to the present invention.

FIG. 17 illustrates an example of a transmitter station 500 useful in accordance with the present invention. Transmitter station 500 comprises a paging terminal 502 used to enter messages originated in a home or local area with respect to a receiver, as indicated at 504, or the messages are for receiver that is roaming outside its local area, as indicated at 506. Messages for a roaming receiver which are originated outside of the coverage area home or local area of a receiver are conveyed to the paging terminal 502 by a hardwire interconnect with a paging terminal in the home or local area, such as a dial-up or hardwired phone line, or by means of an RF signal, such as a satellite receiver.

Messages entered into paging terminal 502 are processed for transmission into the signaling format or protocol described above, and in the aforementioned patent, or another suitable signaling protocol. The messages are placed in queues corresponding to the frame to which a receiver is assigned. The output of the paging terminal is coupled to an RF transmitter 508 for transmission via an antenna 510. It is appreciated that the paging terminal 502 optionally controls more than one transmitter, as in a wide area simulcast system, and synchronization of multiple transmitters in a simulcast system is provided. Various methods for synchronizing the transmitters are available, such as described in U.S. Pat. No. 4,718,109 to Breeden et al.

Furthermore, in order to provide for global synchronization of transmitters to frame 0 as described above, a synchronization module 512 is coupled to the paging terminal 502. The synchronization module comprises a global position system (GPS) receiver 514 and a timing module 516, which together enable the paging terminal 502 to determine an accurate occurrence of frame 0. Instead of a GPS receiver 514, another time standard signal is monitored by suitable monitoring devices.

It should be understood that although the invention has been described in connection with a particular signaling protocol, the invention is useful in connection with any synchronous signaling protocol.

The above description is intended by way of example only and is not intended to limit the present invention in any way except as set forth in the following claims.

What is claimed is:

1. A method for communicating messages to a plurality of addressable receivers, the method comprising steps of:

dividing a network into a plurality of service areas, each service area comprising at least one zone;

assigning to each network a network roaming identifier which comprises at least a network identifier and a service area identifier such that the network identifier is common throughout a network, the service area identifier for identifying a service area within a network;

storing in at least one receiver subscribed for receiving messages in at least one particular network a network roaming identifier associated with the at least one particular network;

generating a signal for transmission in each zone, the signal including at least one network roaming identifier corresponding to a network that includes a service area corresponding to that zone, the signal comprising a plurality of consecutive time cycles, each time cycle comprising a plurality of consecutive time slots, the network roaming identifier being located in an ordered time slot based on an algebraic relationship between a transmission frequency of the signal, an order of a time cycle, and a binary representation of at least a portion of the network roaming identifier; and transmitting the signal in each zone.

2. The method of claim 1, wherein the step of generating comprises locating all network roaming identifiers within a first predetermined number of time slots in a cycle for each transmission frequency of a signal transmitted in a zone.

3. The method of claim 1, wherein the step of generating a signal for transmission comprises locating the network roaming identifier in a particular one of N time slots, where N is equal to a predetermined integer representing a predetermined number of time slots, the particular one of N time slots being determined by a modulo N mathematical operation of a sum of a cycle number representing the order of the time cycle, modulo N of an integer representation of the transmission frequency of the signal and modulo N of a predetermined number of least significant bits of the binary representation of the network roaming identifier.

4. The method of claim 3, wherein N is equal to 8.

5. The method of claim 1, and comprising the steps in a receiver of determining an expected time slot of a network roaming identifier in the signal transmitted in the zone by an algebraic relationship between the transmission frequency of the signal transmitted in the zone, an order of a time cycle, and a binary representation of at least a portion of the network roaming identifier stored in the at least one receiver.

6. The method of claim 5, wherein the network roaming identifier stored in the at least one receiver comprises an address associated with the at least one receiver.

7. The method of claim 6, wherein the step of generating comprises generating at least one message associated with the address in the signal, and wherein the at least one receiver compares the at least one network roaming identifier stored therein with the network roaming identifier in the signal transmitted in the zone in order to receive messages which are associated with the address in the signal.

8. A method for communicating messages to a plurality of addressable receivers, the method comprising steps of:

dividing a coverage area into a plurality of zones;

assigning to each coverage area a coverage area identifier which comprises at least a local area identifier and a zone identifier such that the local area identifier is common throughout a coverage area, the zone identifier for identifying a zone within a coverage area;

storing in at least one receiver subscribed for receiving messages in at least one particular network a coverage area identifier associated with at least one particular coverage area;

generating a signal for transmission in each zone, the signal including at least one coverage area identifier corresponding to a zone within a coverage area, the signal comprising a plurality of consecutive time cycles, each time cycle comprising a plurality of consecutive time slots, the coverage area identifier being located in first predetermined number of time slots of the signal; and transmitting the signal in each zone.

9. A method for communicating messages to a plurality of addressable receivers, the method comprising steps of:

dividing a network into a plurality of service areas, each service area comprising at least one coverage area, and each coverage area comprising at least one zone;

assigning to each network a network roaming identifier which comprises at least a network identifier and a service area identifier such that the network identifier is common throughout a network, the service area identifier for identifying a service area within a network;

assigning to each coverage area a coverage area identifier which comprises at least a local area identifier and a zone identifier such that the local area identifier is common throughout a coverage area, the zone identifier for identifying a zone within a coverage area;

storing in at least one receiver subscribed for receiving messages in at least one particular network a particular network roaming identifier associated with the at least one particular network;

storing in at least one receiver subscribed for receiving messages in at least one particular coverage area at least one particular coverage area identifier associated with the at least one particular coverage area;

generating a signal for transmission in each zone, the signal including at least one network roaming identifier corresponding to a network that includes a service area corresponding to that zone, and the signal including a coverage area identifier corresponding to a coverage area that includes that zone, the signal comprising a plurality of consecutive time cycles, each time cycle comprising a plurality of consecutive time slots, the network roaming identifier being located in an ordered time slot based on an algebraic relationship between a transmission frequency of the signal, an order of a time cycle, and a binary representation of at least a portion of the network roaming identifier, and the coverage area identifier being located in at least a first predetermined number of ordered time slots of each time cycle; and transmitting the signal in each zone.

10. A method for communicating messages to a plurality of receivers, the method comprising steps of:

dividing a network into a plurality of service areas, each service area comprising at least one zone;

assigning to each network a network roaming identifier which comprises at least a network identifier and a service area identifier such that the network identifier is common throughout a network, the service area identifier for identifying a service area within a network;

generating a signal for transmission in each zone, the signal including at least one network roaming identifier corresponding to a network that includes a service area corresponding to that zone, the signal comprising a plurality of consecutive time cycles, each time cycle comprising a plurality of consecutive time slots, the network roaming identifier being located in an ordered time slot based on an algebraic relationship between a transmission frequency of the signal, an order of a time cycle, and a binary representation of at least a portion of the network roaming identifier; and transmitting the signal in each zone.

11. The method of claim 10, wherein the step of generating comprises locating all network roaming identifiers within a first predetermined number of time slots in a cycle for each transmission frequency of a signal transmitted in a zone.

12. The method of claim 10, wherein the step of generating a signal for transmission comprises locating the network roaming identifier in a particular one of N time slots, where N is equal to a predetermined integer representing a predetermined number of time slots, the particular one of N time slots being determined by a modulo N mathematical operation of a sum of a cycle number representing the order of the time cycle, modulo N of an integer representation of the transmission frequency of the signal and modulo N of a predetermined number of least significant bits of the binary representation of the network roaming identifier.

13. The method of claim 12, wherein N is equal to 8.

14. The method of claim 10, wherein each service area comprises at least one coverage area, and each coverage area comprises at least one zone, the step of assigning further comprising assigning to each coverage area a coverage area identifier which comprises at least a local area identifier and a zone identifer such that the local area identifier is common throughout a coverage area, the zone identifier for identifying a zone within a coverage area; and the step of generating a signal for transmission further comprising locating a coverage area identifier corresponding to a zone within a coverage area in at least a first predetermined number of ordered time slots of each time cycle.

15. A selective call receiver comprising:

a receiver circuit for receiving a transmitted signal and generating output signals, the transmitted signal including a network roaming identifier and comprised of a plurality of consecutive time cycles, each time cycle comprising a plurality of consecutive time slots;

a control circuit coupled to the receiver circuit and responsive to the output signals of receiver, the control circuit comprising a memory for storing a particular network roaming identifier associated with at least one particular network in which the selective call receiver is subscribed to receive messages, the particular network roaming identifier further comprising an address associated with the selective call receiver for designating messages for the selective call receiver, a processor circuit for decoding the output signals from the receiver circuit in accordance with a control program, the processor circuit being programmed by the control program for:

determining an order of a time cycle of the transmitted signal received by the receiver circuit;

determining an expected time slot of the particular network roaming identifier in the transmitted signal by an algebraic relationship between a transmission frequency of the transmitted signal received by the receiver circuit, an order of a time cycle of the transmitted signal receive by the receiver circuit, and a binary representation of at least a portion of the particular network roaming identifier stored in memory of the control circuit; and decoding the particular network roaming identifier in the expected time slot of the transmitted signal and recovering a message in the transmitted signal associated with the address of the selective call receiver.

16. The selective call receiver of claim 15, and further comprising a frequency synthesizer circuit coupled to the receiver circuit for changing a tuning frequency of the receiver circuit, wherein the processor is further programmed by the control program to respond to traffic splitting flags in the transmitted signal to cause the frequency synthesizer to change the tuning frequency of the receiver circuit so that the selective call receiver receives messages carried by a transmitted signal on a different transmission frequency.

* * * * *